US007716154B2

(12) United States Patent
Aggarwal et al.

(10) Patent No.: US 7,716,154 B2
(45) Date of Patent: May 11, 2010

(54) METHODS AND APPARATUS FOR GENERATING DECISION TREES WITH DISCRIMINANTS AND EMPLOYING SAME IN DATA CLASSIFICATION

(75) Inventors: Charu C. Aggarwal, Yorktown Heights, NY (US); Philip Shi-Lung Yu, Chappaqua, NY (US)

(73) Assignee: International Business Machines Coporation, Armonk, NY (US)

( * ) Notice: Subject to any disclaimer, the term of this patent is extended or adjusted under 35 U.S.C. 154(b) by 220 days.

(21) Appl. No.: 11/841,221

(22) Filed: Aug. 20, 2007

(65) Prior Publication Data

US 2007/0288417 A1   Dec. 13, 2007

Related U.S. Application Data

(63) Continuation of application No. 09/562,552, filed on May 2, 2000, now Pat. No. 7,310,624.

(51) Int. Cl.
*G06N 5/00* (2006.01)
(52) U.S. Cl. .......................................... 706/52; 706/45
(58) Field of Classification Search .................... 706/52, 706/45; 382/226, 224
See application file for complete search history.

(56) References Cited

U.S. PATENT DOCUMENTS

| | | | | |
|---|---|---|---|---|
| 5,930,392 A | * | 7/1999 | Ho | 382/224 |
| 6,009,199 A | * | 12/1999 | Ho | 382/224 |
| 6,055,539 A | | 4/2000 | Singh et al. | |
| 6,058,205 A | | 5/2000 | Bahl et al. | |
| 6,101,275 A | * | 8/2000 | Coppersmith et al. | 382/226 |
| 6,148,303 A | | 11/2000 | Morimoto et al. | |
| 6,519,580 B1 | * | 2/2003 | Johnson et al. | 706/47 |

OTHER PUBLICATIONS

Rome, et al., A Hierarchical Projection Pursuit Clustering Algorithm, The Graduate Center of the City University of New York, Aug. 18, 2003, pp. 1-45.*
D.E. Gustafson et al. "A Nonparametric Multiclass Partitioning Method for Classification," IEEE, pp. 654-659, 1980.

(Continued)

*Primary Examiner*—Wilbert L Starks, Jr.
(74) *Attorney, Agent, or Firm*—Kenneth R. Corsello; Ryan, Mason & Lewis, LLP

(57) ABSTRACT

Methods and apparatus are provided for generating a decision trees using linear discriminant analysis and implementing such a decision tree in the classification (also referred to as categorization) of data. The data is preferably in the form of multidimensional objects, e.g., data records including feature variables and class variables in a decision tree generation mode, and data records including only feature variables in a decision tree traversal mode. Such an inventive approach, for example, creates more effective supervised classification systems. In general, the present invention comprises splitting a decision tree, recursively, such that the greatest amount of separation among the class values of the training data is achieved. This is accomplished by finding effective combinations of variables in order to recursively split the training data and create the decision tree. The decision tree is then used to classify input testing data.

30 Claims, 5 Drawing Sheets

OTHER PUBLICATIONS

J. Shafer et al., "Sprint: A Scalable Parallel Classifier for Data Mining," Proceedings of the 22nd VLDB Conference, Mumbai (Bombay), India, pp. 1-12, 1996.

M. Mehta et al., "SLIQ: A Fast Scalable Classifier for Data Mining," Proceedings of the Fifth International Conference on Extending Database Technology, Avignon, France, Mar. 1996.

C. Apte, et al., "RAMP: Rules Abstraction for Modeling and Prediction," IBM Research Report RC 20271, pp. 1-14, Jun. 1995.

R. Agrawal et al., "An Interval Classifier for Database Mining Applications," Proceedings of the 18th VLDB Conference, Vancouver, British Columbia, Canada, pp. 1-14, 1992.

J.R. Quinlan, "Induction of Decision Trees," Machine Learning, vol. 1, No. 1, pp. 81-105, 1986.

M. Mehta et al., "MDL-based Decision Tree Pruning," IBM Almaden Research Center, San José, California, pp. 1-6, 1995.

* cited by examiner

US 7,716,154 B2

METHODS AND APPARATUS FOR GENERATING DECISION TREES WITH DISCRIMINANTS AND EMPLOYING SAME IN DATA CLASSIFICATION

CROSS-REFERENCE TO RELATED APPLICATION(S)

This application is a continuation of U.S. application Ser. No. 09/562,552, filed on May 2, 2000, which issued as U.S. Pat. No. 7,310,624, on Dec. 18, 2007, the disclosure of which is incorporated by reference herein.

FIELD OF THE INVENTION

The present invention is related to data classification and, more particularly, to methods and apparatus for generating decision trees using linear discriminant analysis.

BACKGROUND OF THE INVENTION

The data classification problem is well known in the literature for its numerous applications in customer segmentation, customer targeting, and marketing. A supervised data classification problem is defined as follows. A set of records is given, each of which contains a set of feature variables and another predefined variable which is referred to as the class variable. This set of records is referred to as the training data. This training data is used to construct models in which the class variable may be predicted in a record in which the feature variables are known but the class variable is unknown. In order to perform this prediction, a model is constructed in which the feature variables are related to the class variable.

Numerous techniques are known which relate the feature variables to the class variable. In order to perform the classification, numerous techniques are known for creating the relationship between the feature variables and the class variables. The techniques for building the relationships include, for example, DNF (Disjunctive Normal Form) Rules, decision trees, and Bayes classifiers, among others, see, e.g., Agrawal R., Ghosh S., Inielinski T., Iyer B., and Swami A., "An Interval Classifier for Database Mining Applications," Proceedings of the 18th VLDB Conference, Vancouver, British Columbia, Canada 1992; Apte C, Hong S. J., Lepre J., Prasad S., and Rosen B, "RAMP: Rules Abstraction for Modeling and Prediction," IBM Research Report RC 20271, June 1995; Quinlan J. R., "Induction of Decision Trees," Machine Learning, Volume 1, Number 1, 1986; Shafer J., Agrawal R., and Mehta M., "SPRINT: A Scaleable Parallel Classifier for Data Mining," Proceedings of the 22nd VLDB Conference, Bombay, India, 1996; Mehta M., Agrawal R., and Rissanen J., "SLIQ: A Fast Scaleable Classifier for Data Mining," Proceedings of the Fifth International Conference on Extending Database Technology, Avignon, France, March 1996, the disclosures of which are incorporated by reference herein.

In decision trees, which is the classification model technique to which the present invention is directed, a goal is to construct a hierarchical decomposition of the data. This hierarchical decomposition is used to create partitions of the data in which one of the class variables dominates. Tn order to predict the class variable for a record in which only the feature variables are known, the hierarchical partition in which the record lies is found. The dominant partition is used in order to predict the class variable. Decision trees are further discussed, for example, in J. C. Shafer, R. Agrawal, M. Mehta, "SPRINT: A Scalable Parallel Classifier for Data Mining," Proc. of the 22th Int'l Conference on Very Large Databases, Mumbai (Bombay), India, September 1996; M. Mehta, R. Agrawal and J. Rissanen, "SLIQ: A Fast Scalable Classifier for Data Mining," Proc. of the Fifth Int'l Conference on Extending Database Technology, Avignon, France, March 1996; and M. Mehta, J. Rissanen, and R. Agrawal, "DML-based Decision Tree Pruning," Proc. of the 1 st Int'l Conference on Knowledge Discovery in Databases and Data Mining, Montreal, Canada, August, 1995, the disclosures of which are incorporated by reference herein.

In order to explain this further, the following example is presented. Consider a set of records comprising the following two feature variables: (i) age, and (ii) whether or not the person is a smoker; and the class variable comprising an indication of whether or not the person suffers from lung cancer. The distribution of records is such that smokers of higher age are more likely to suffer from lung cancer. A decision tree may partition the data in the following way. In the first phase, there are two branches formed; one corresponding to people who smoke, and another corresponding to people who do not. The branch corresponding to the people who smoke is more likely to have a higher percentage of lung cancer patients. At the second level, the tree is divided into two branches; one corresponding to the people with a higher age, and another corresponding to the people with a lower age. Thus, there are a total of four nodes at the lower level of the tree, and each of these nodes has a much lower number of records, but with different proportions of the class variable. Thus, for a given record, in which the class variable is not known, the class variable can be better predicted by finding the percentage of the class variables in the node in which the current record fits. Thus, this above-described method is one in which the decision trees are created by splits (i.e., division of the tree into branches) using a single variable.

However, it would be highly advantageous to have methodologies in which the splits are created by linear combinations of variables which discriminate between the different nodes effectively.

SUMMARY OF THE INVENTION

The present invention provides methods and apparatus for generating a decision trees using linear discriminant analysis and implementing such a decision tree in the classification (also referred to as categorization) of data. The data is preferably in the form of multidimensional objects, e.g., data records including feature variables and class variables in a decision tree generation mode, and data records including only feature variables in a decision tree traversal mode. Such an inventive approach, for example, creates more effective supervised classification systems. In general, the present invention comprises splitting a decision tree, recursively, such that the greatest amount of separation among the class values is achieved. This is accomplished by finding effective combinations of variables in order to recursively split the data and create the decision tree.

More specifically, the present invention provides methodologies employing recursive discriminant analysis to create the combinations of features which are used to create the recursive splits. For example, consider a case where the feature variables comprise age, salary, and height in respective units. One possible example of a predicate or condition which is used to create a split may be: 30age+25salary+height 302. Thus, all the records which satisfy this predicate will have some distribution of the class variable, whereas all records which violate this predicate will have a different distribution.

It is also clear that different ways of performing the split will have different levels of discrimination as far as the nearest neighbor is concerned. Clearly, as mentioned above, it is unlikely that the particular kind of split where a single attribute or variable is used is the best possible split. A good split is one in which there is greater separation of the classes. For example, if in the above case the class variable corresponded to whether or not a person suffers from lung cancer, then a good split would be one in which one of the branches corresponds to all the people who have lung cancer, while the other branch corresponds to all the people who do not. This is because such a split would result in the greatest level of discriminatory power.

Accordingly, in one aspect of the present invention, a method of generating at least a portion of a decision tree structure from one or more multidimensional data objects comprises the following steps. First, data associated with the one or more multidimensional data objects is represented as a node of the decision tree structure. Next, a condition is determined for dividing the data at the node into at least two subsequent nodes based on a discriminant measure which substantially maximizes separation between classes associated with the data. Lastly, the data is divided based on the condition, wherein the resulting nodes form at least a portion of the decision tree structure. The condition determining and data dividing steps may be repeated at each subsequent node.

It is to be appreciated that the discriminant measure may be determined in accordance with a Fisher's discriminant technique. In such case, the data is divided at a split plane determined to be perpendicular to a direction determined according to the Fisher's discriminant technique, as will be explained below. The split plane may be determined to be a plane where an entropy measure is substantially optimized. The entropy measure may be determined in accordance with a gini index, as will be explained below. It is to be appreciated that other discriminant measures and/or other entropy measures may be employed in accordance with the present invention.

In another aspect of the present invention, a method of performing data classification comprises the steps. First, at least a portion of a decision tree structure is generated from one or more multidimensional training data objects in accordance with the methodology described above. Then, the decision tree structure is used to predict one or more class variables associated with one or more multidimensional testing data objects in which only one or more feature variables are known. The class variable may be found by using tree traversal on the decision tree structure. A branch may be selected to traverse based on an entropy measure. For example, the branch yielding the lowest entropy measure may be selected as the branch to traverse.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system in which it is desirable to perform supervised data classification via decision tree construction using linear discriminant analysis in order to achieve more effective classification or categorization results.

Figure 1:
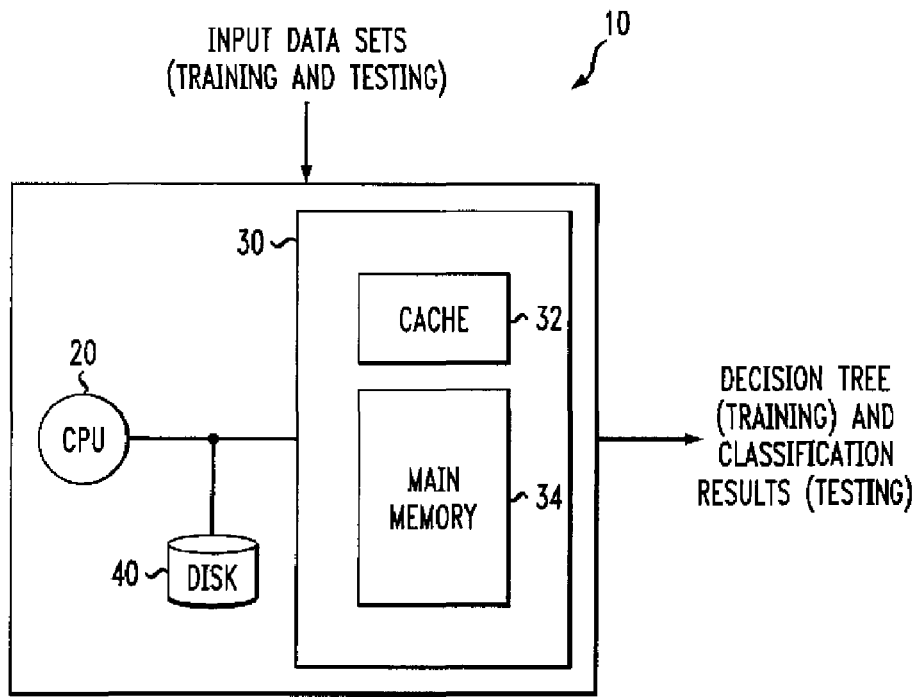
FIG. 1 is a block diagram illustrating a hardware implementation suitable for employing data classification using decision tree construction methodologies according to an embodiment of the present invention.

Referring initially to FIG. 1, an exemplary architecture suitable for employing the present invention is shown. As illustrated, an exemplary system comprises a computer system 10. The computer system 10 may be a separate system used to process input data. The computer system 10 may alternatively be part of a server which is coupled to multiple client devices via a network (e.g., Internet, private network, a local area network, or some other suitable network), wherein the client devices communicate with the server in order to access a database resident on the server. The methodologies of the invention may operate on all or portions of the data associated with the database. In any case, the system 10 comprises a central processing unit (CPU) 20, a memory 30 and a disk 40. The memory 30 may comprise a cache 32 and a main memory 34. In a training mode, the data input to the computer system 10 includes a training data set, including records with feature variables and class variables, which is used to generate a decision tree. In a testing mode, the data input is a testing data set, including records with only feature variables and no class variables, which is the subject of the classification or categorization operation. Since an input data set may be very large, data sets are preferably stored on the disk 40. The calculations for creating a decision tree from a training data set and using the decision tree to perform supervised data classification on a testing data set, according to the invention, are performed in the CPU 20 in association with the cache 32 and the main memory 34 of the memory 30. The cache 32 is preferably present in the system in order to speed up calculations. The output of system 10 in training mode is the decision tree. In the testing mode, the output is the classification results, e.g., the class variable associated with the input record.

Accordingly, in this illustrative embodiment, the decision tree construction and implementation operations of the present invention are executed in association with the computer system 10. All or a portion of the results generated in association with the computer system may be presented on a display (not shown) to a system user, if so desired. Further, in one embodiment, software components including program instructions or code for performing the methodologies of the invention, as described herein, may be stored in one or more memory devices described above and, when ready to be utilized, loaded in part or in whole and executed by the CPU.

Figure 2:
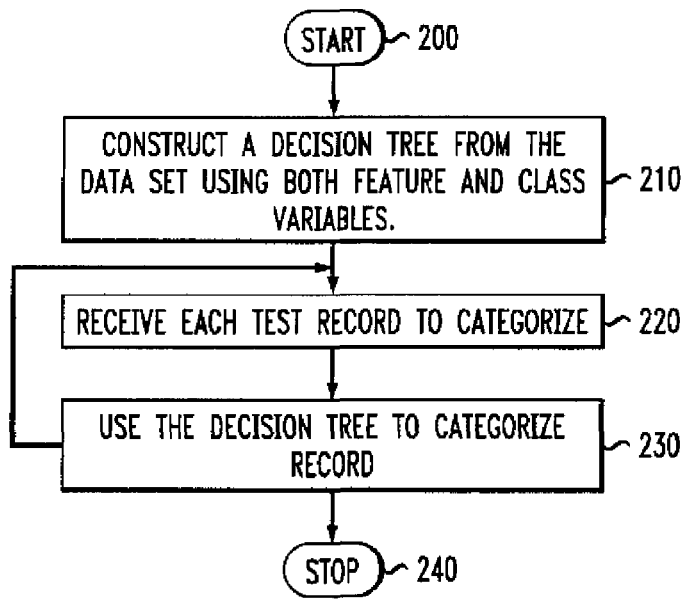
FIG. 2 is a flow diagram illustrating an overall data classification procedure according to an embodiment of the present invention.

Referring now to FIG. 2, a flow diagram is shown illustrating an overall data classification or categorization procedure for performing training and testing of a data set according to an embodiment of the present invention. The overall process begins at block 200. In the overall process, the first step comprises creating a decision tree from training data, including feature variables and a class variable, which is then used for the purpose of categorization. This is accomplished in step 210. Details of this process are explained below in the context of FIG. 3. Once the decision tree is constructed using the training data, in step 220, a test record to be categorized is received by the system. This record is categorized by employing the decision tree, in step 230. Steps 220 and 230 are repeated for each record of the testing data set. The process ends at block 240 when all test records have been classified. Classification results may be stored and/or output to a system user.

Figure 3:
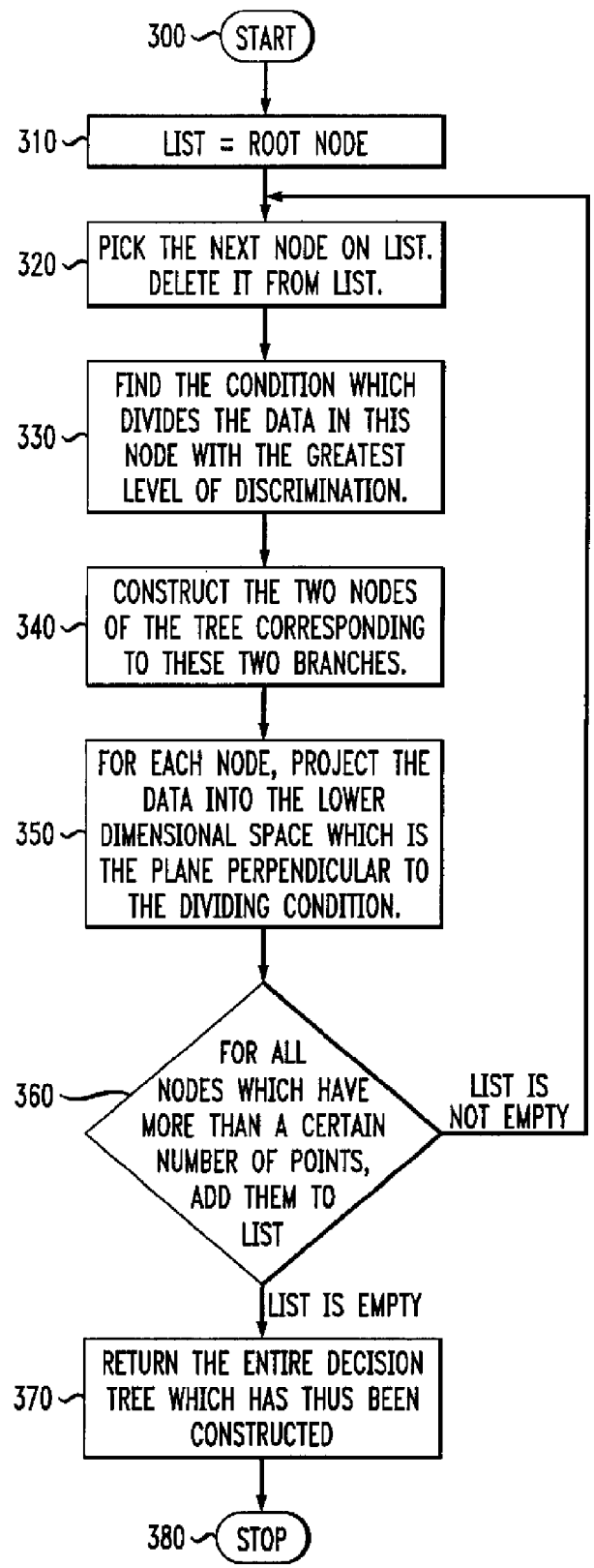
FIG. 3 is a flow diagram illustrating an overall process for construction a decision tree according to an embodiment of the present invention.

Referring now to FIG. 3, a flow diagram is shown illustrating an overall process for construction a decision tree according to an embodiment of the present invention. It is to be appreciated that the process of FIG. 3 corresponds to step 210 of FIG. 2. Unlike the existing decision tree construction techniques described above, the present invention uses repeated discriminant analysis in order to construct the tree, as will be explained in detail below. The inventive methodology uses a top down construction of the decision tree in order to build the nodes successively. The top down construction is facilitated by the use of a tracking parameter which we refer to as LIST.

The process begins at block 300. It is to be understood that the input to the process is the data set including the feature variables and the class variable. A "node" in this decision tree corresponds to a subset of the data which has been created by the various split points at the various levels. The starting point node is the entire data set, and the decision tree (and lower nodes) are built by creating further splits in the data. For example, Age 30 is a predicate or condition which creates a split, and divides a given node into two depending upon the age. Of course, as explained herein and below in further detail, the present invention does not rely on single attributes (e.g., Age) to create splits, but finds particular directions which are more relevant.

Thus, in step 310, the LIST is initialized to the root node of the tree. This initialization of the LIST is used to pick successive lower level nodes. In step 320, the next node on LIST is selected. This node is then deleted from LIST. In step 330, the condition or predicate which divides the data in the node with the greatest level of discrimination is selected. Step 330 will be further explained below in the context of FIG. 6. In step 340, the two nodes of the tree corresponding to these two branches are constructed. For each node, we project the data into a lower dimensional (feature) space which is the plane perpendicular to the dividing condition. This is done in step 350. It is to be understood that the terms dimension and feature may be used interchangeably. The process of projecting the data onto a plane perpendicular to a given direction changes the data representation. The projected data contains one dimension less, and its attribute set is different. An example of this projection used for decision tree construction according to the invention will be explained below in the context of FIGS. 7A through 7D. In step 360, for all nodes which have more than a certain number of points, we add them to LIST, if any. It is to be appreciated that the term "point" refers to a database record. Note that in step 320, LIST was reduced by one node. So, after this iteration, the LIST size could either increase or decrease. It is to understood that LIST may increase or decrease in a given iteration since, in step 360, no node, or one or more nodes may be added to LIST, whereas, in step 320, LIST is reduced by one node. Thus, at this point, the LIST is checked to determine whether or not it is empty. If LIST is not empty, then the process returns to step 320 for the next iteration where the descendants of the next node on LIST are examined. If the LIST is empty, then the process returns the entire decision tree, which has thus been constructed. This is done in step 370. The process ends at block 380.

Figure 4:
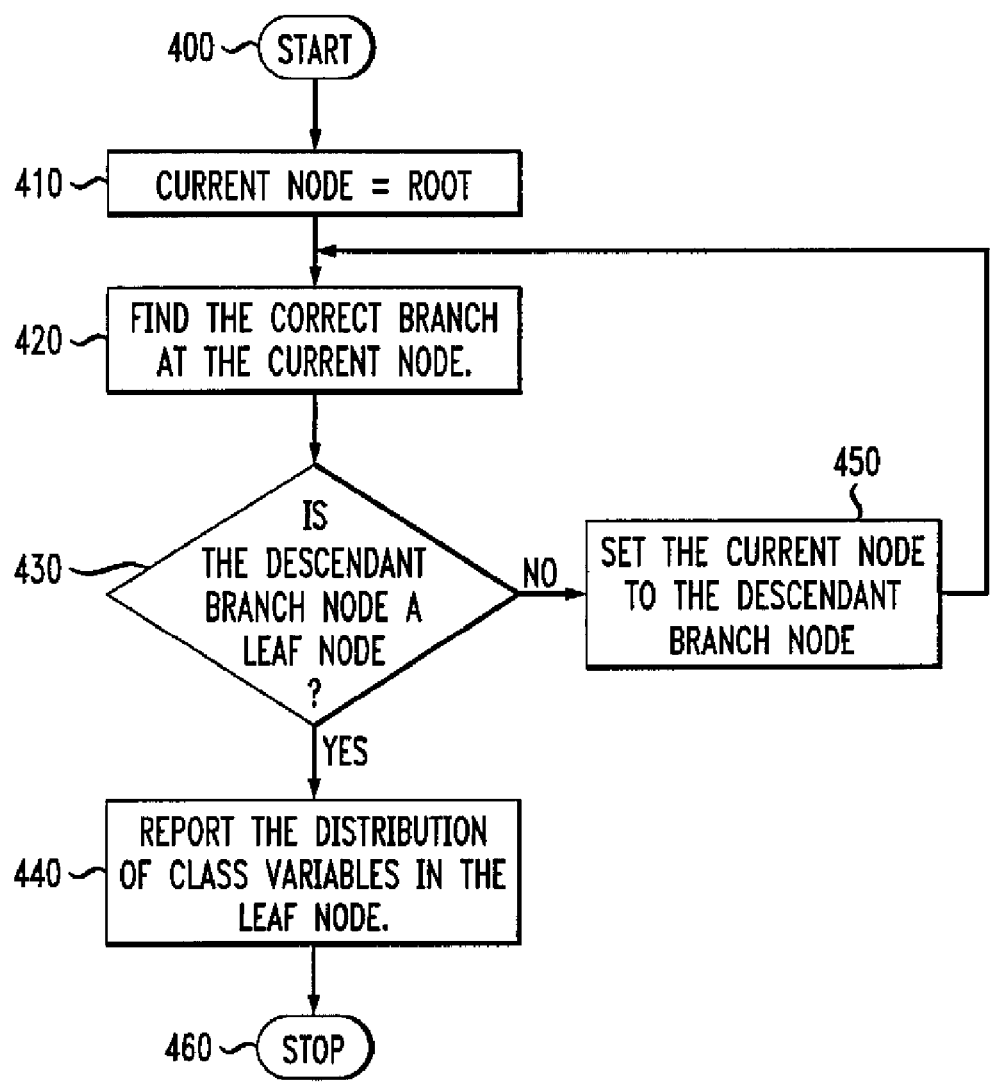
FIG. 4 is a flow diagram illustrating a procedure for using a decision tree to decide the class variable for a record in which only the feature variables are known according to an embodiment of the present invention.

Referring now to FIG. 4, a flow diagram is shown illustrating a procedure for using a decision tree to decide the class variable for a record in which only the feature variables are known according to an embodiment of the present invention. It is to be appreciated that the process of FIG. 4 corresponds to step 230 of FIG. 2. The process begins at block 400. In step 410, a variable referred to as Current Node is set to the root node. In step 420, the correct branch to traverse at the current node is found. A detailed process for finding the correct branch to traverse is explained below in the context of FIG. 5. In step 430, the process determines if the descendant branch node is a leaf node. A leaf node is a node which has no descendants. If so, then in step 440, the process reports the distribution of the class variables in the leaf node. This distribution of class labels indicates the relative probabilistic distributions of the various classes. If the descendant branch is not a leaf node, then the current node is set to the descendant branch node, in step 450, and the process returns to the step 420. Thus, given an input record with a set of feature variables, the process of FIG. 4 outputs the class variable.

Figure 5:
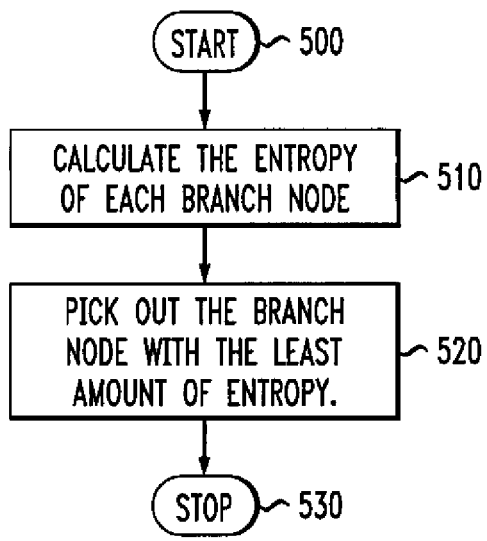
FIG. 5 is a flow diagram illustrating a procedure for choosing the correct branch of a decision tree while finding which nodes are relevant to a given record according to an embodiment of the present invention.

Referring now to FIG. 5, a flow diagram is shown illustrating a procedure for choosing the correct branch of a decision tree to traverse while finding which nodes are relevant to a given record according to an embodiment of the present invention. It is to be appreciated that the process of FIG. 5 corresponds to step 420 of FIG. 4. The process begins at block 500. The input to the process is the possible branch nodes. In step 510, the process calculates the "entropy" of each node which is a child of the current node. It is to be appreciated that, in order to calculate a level of discrimination, the present invention employs a concept referred to as "entropy." The entropy of a set of branches of a decision tree refers to the level of separation of the various class variable distributions under that node. For example, let us consider a class variable which has two states. In such a case, let $p_i$ be the percentage of the data which takes on a particular state from node i, where i varies from 1 though n, for each of the n possible branches of that node. Then, one measure of the entropy is referred to as the "gini index." The gini index for the node from which the n branches emanate is defined as: . Note that the lower the value of the gini index, the greater the amount of discrimination, and the higher the value of the gini index, the less the level of discrimination. It is to be appreciated that the gini index is further described in M. Mehta, R. Agrawal and J. Rissanen, "SLIQ: A Fast Scalable Classifier for Data Mining," Proc. of the Fifth Int'l Conference on Extending Database Technology, Avignon, France, March 1996, the disclosure of which is incorporated by reference herein. It is to be further appreciated that other entropy measures may be employed, see, e.g., Agrawal R., Ghosh S., Imielinski T., Iyer B., and Swami A., "An Interval Classifier for Database Mining Applications," Proceedings of the 18th VLDB Conference, Vancouver, British Columbia, Canada 1992, the disclosure of which is incorporated by reference herein. The node with the least entropy is picked as the most desirable branch. This is returned as the output in step 520. The process ends at block 530.

Figure 6:
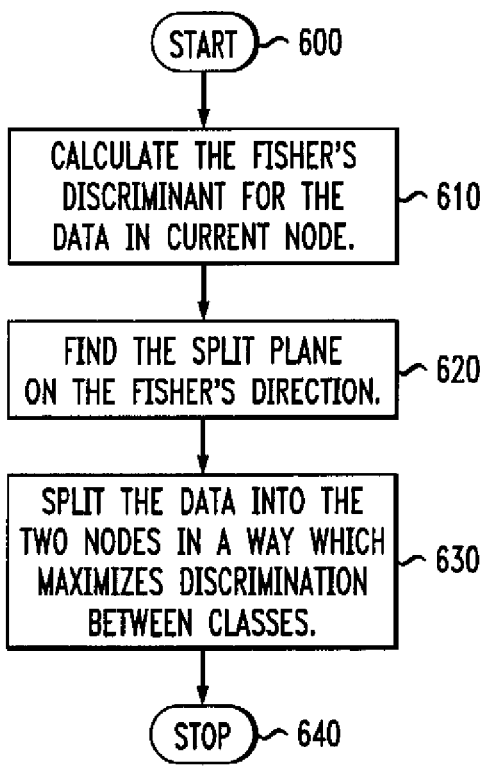
FIG. 6 is a flow diagram illustrating a procedure for splitting up data at a given node of a decision tree according to an embodiment of the present invention.

Referring now to FIG. 6, a flow diagram is shown illustrating a procedure for splitting up data at a given node of a decision tree according to an embodiment of the present invention. It is to be appreciated that the process of FIG. 6 corresponds to step 330 of FIG. 3. The process begins at block 600. In step 610, a measure referred to as the "Fisher's discriminant" of the data is calculated in the current node. The "Fisher's discriminant" is used to perform splits recursively such that the maximum level of discrimination among the classes is attained. Use of Fisher's discriminant is well known and is described in the prior art literature, e.g., Chakrabarti S., Dom B., Agrawal R., and Raghavan P., "Scalable Feature Selection, Classification and Signature Generation for Organizing Large Text Databases into Hierarchical Taxonomies," VLDB Journal, 7(3), pp. 163-178, 1998, the disclosure of which is incorporated by reference herein.

Fisher's discriminant method finds a direction along which the relative class separation as measured by the ratio of the interclass to intraclass variance is maximized. More specifically, let X and Y be two sets of database records corresponding to a two class problem, and let (X) and (Y) be the respective centroids. A centroid is obtained by averaging all the d-dimensional records in the set and is a vector containing d dimensions or features. Further, let the covariance matrix for the sets of points X and Y be denoted by M(X) and M(Y). The covariance matrix for a set of points is a d d matrix (d is the number of dimensions), in which the entry (i, j) is the covariance between dimensions i and j. Let $M=(\frac{1}{2})(M(x)+M(y))$ and $=(X)-(Y)$. Then, the Fisher's discriminant (or direction) is given by $M^{-1}$, where $M^{-1}$ is the inverse of the matrix. By using the Fischer's discriminant repeatedly, in accordance with the invention, splits may be found recursively in a way so that, in each case, there is the maximum amount of discrimination among the different nodes. It is to be appreciated that other discriminant measures may be employed.

Thus, once the Fisher's direction has been determined in step 610, the split plane is determined as perpendicular to the Fisher's direction. This is done in step 620. The plane is made to pass through one of the points in the database. This is done by choosing the point for which the corresponding gini index (or other entropy measure) is optimized so as to maximize class separation. This is done by picking the database points one by one and calculating the measure for each possibility. We pick the optimum value out of these possibilities. Accordingly, in step 630, the data is split into two nodes in a way that maximizes discrimination between classes. Thus, given data at a given node, the process of FIG. 6 yields the best possible data split at the node. The process of FIG. 6 is then repeated to determine further nodes until the decision tree is completed. It is to be appreciated that, as per the process described in the context of FIG. 3, the decision tree is complete when LIST is empty.

Figure 7:
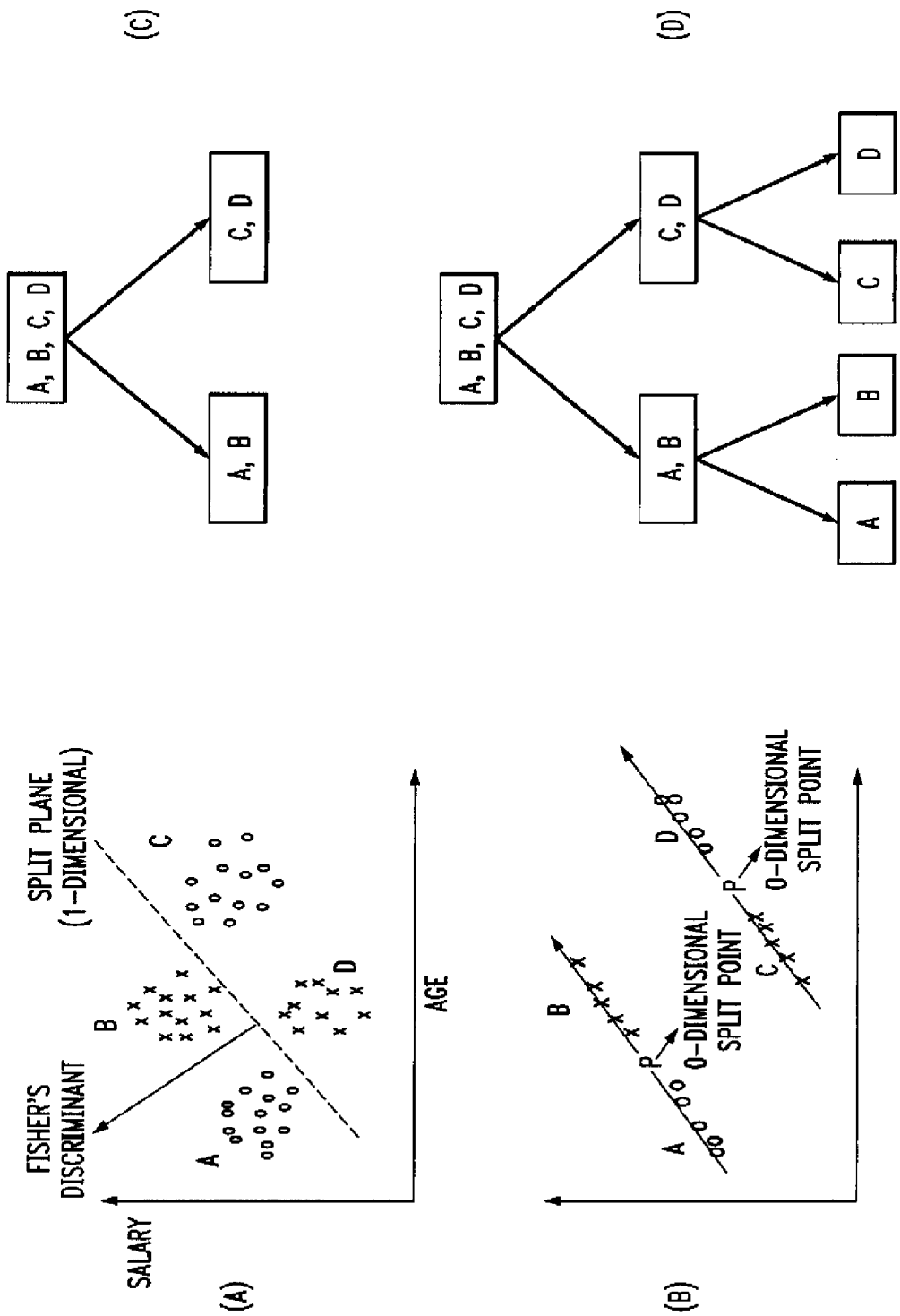
FIGS. 7A through 7D are diagrams illustrating an example of decision tree construction according to an embodiment of the present invention.

Referring now to FIGS. 7A through 7D, diagrams are shown illustrating an example of decision tree construction according to an embodiment of the present invention. FIG. 7A shows a two-dimensional data set, where the feature set consists of two possible attributes: age and salary. There are two classes in the data set, which are respectively marked by "x" and "o" in FIG. 7A. In order to illustrate the process better, an artificial example has been intentionally created in which there are four natural clusters (close groups of points) in the data marked A, B, C, D. In the first step, Fisher's discriminant is found. This is illustrated in FIG. 7A. This defines the split plane as the plane which is perpendicular to this vector (shown by dotted line). Note that this plane is 1-dimensionality lower than the whole space. Since this is a 2-dimensional problem, the split plane is a 1-dimensional line, and is indicated by the dotted line in FIG. 7A. Note that if this was a 3-dimensional problem, the split plane would have been 2-dimensional. Furthermore, the Fisher's direction shown in the diagram is somewhat hypothetical (for the purpose of illustration), and may not correspond with a precise mathematical analysis of the diagram shown here. The split plane divides the data into two sections, one containing the clusters A, B and the other containing the clusters C, D. The corresponding decision tree is shown in FIG. 7C. At this stage, each of these two groups of data are treated independently as shown in FIG. 7B. In the next step, each of these groups of data are (independently) projected onto the 1-dimensional split plane. Both independent projections are shown in FIG. 7B. At this stage, the 0-dimensional split point which maximizes the separation is found. The corresponding split and the decision tree is illustrated in FIG. 7D.

Accordingly, as explained in detail above, the present invention provides methodologies for creating a decision tree which provides effective discrimination between the nodes at every level of the tree. The invention creates splits at every level of the tree which maximize the level of separation between the different classes. This results in a decision tree which is more effective and useable for performing effective classification.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of generating at least a portion of a decision tree structure to classify one or more multidimensional data objects, the method comprising the steps of:

representing data associated with one or more multidimensional data objects as a node of the decision tree structure;

determining a condition for dividing the data at the node into at least two subsequent nodes based on a discriminant measure which substantially maximizes separation between classes associated with the data; and dividing the data based on the condition, wherein the resulting nodes form at least a portion of the decision tree structure;

wherein the steps are performed by a computer;

wherein the one or more multidimensional data objects comprise data records of personal attributes stored on a data storage device coupled to the computer.

2. The method of claim 1, wherein the condition determining and data dividing steps are repeated at each subsequent node.

3. The method of claim 1, wherein the discriminant measure is determined in accordance with a Fisher's discriminant technique.

4. The method of claim 3, wherein the data is divided at a split plane determined to be perpendicular to a direction determined according to the Fisher's discriminant technique.

5. The method of claim 4, wherein the split plane is determined to be a plane where an entropy measure is substantially optimized.

6. The method of claim 5, wherein the entropy measure is determined in accordance with a gini index.

7. A method of performing data classification to classify multidimensional objects, the method comprising the steps of:
- generating at least a portion of a decision tree structure from one or more multidimensional training data objects by: (i) representing data associated with the one or more multidimensional data objects as a node of the decision tree structure; (ii) determining a condition for dividing the data at the node into at least two subsequent nodes based on a discriminant measure which substantially maximizes separation between classes associated with the data; and (iii) dividing the data based on the condition, wherein the resulting nodes form at least a portion of the decision tree structure; and
- using the decision tree structure to predict one or more class variables associated with one or more multidimensional testing data objects in which only one or more feature variables are known;
- wherein the steps are performed by a computer; and
- wherein the one or more multidimensional data objects comprise data records of personal attributes stored on a data storage device coupled to the computer.

8. The method of claim 7, wherein the class variable is found by using tree traversal on the decision tree structure.

9. The method of claim 8, wherein a branch is selected to traverse based on an entropy measure.

10. The method of claim 9, wherein the branch yielding the lowest entropy measure is selected as the branch to traverse.

11. Apparatus for generating at least a portion of a decision tree structure comprising:
- a computer having a memory and a data storage device coupled thereto, wherein the data storage device stores a data store, the data store having one or more multidimensional data objects comprising data records of personal attributes; and
- one or more computer programs, performed by the computer, for: (i) representing data associated with the one or more multidimensional data objects as a node of the decision tree structure; (ii) determining a condition for dividing the data at the node into at least two subsequent nodes based on a discriminant measure which substantially maximizes separation between classes associated with the data; and (iii) dividing the data based on the condition, wherein the resulting nodes form at least a portion of the decision tree structure;
- wherein the memory stores at least a portion of the decision tree structure.

12. The apparatus of claim 11, wherein the condition determining and data dividing operations are repeated at each subsequent node.

13. The apparatus of claim 11, wherein the discriminant measure is determined in accordance with a Fisher's discriminant technique.

14. The apparatus of claim 13, wherein the data is divided at a split plane determined to be perpendicular to a direction determined according to the Fisher's discriminant technique.

15. The apparatus of claim 14, wherein the split plane is determined to be a plane where an entropy measure is substantially optimized.

16. The apparatus of claim 15, wherein the entropy measure is determined in accordance with a gini index.

17. Apparatus for performing data classification of multidimensional objects comprising:
- a computer having a memory and a data storage device coupled thereto, wherein the data storage device stores a data store, the data store having the multidimensional objects comprising data records of personal attributes; and
- one or more computer programs, performed by the computer for: (i) generating at least a portion of a decision tree structure from one or more multidimensional training data objects by representing data associated with the one or more multidimensional data objects as a node of the decision tree structure, determining a condition for dividing the data at the node into at least two subsequent nodes based on a discriminant measure which substantially maximizes separation between classes associated with the data, and dividing the data based on the condition, wherein the resulting nodes form at least a portion of the decision tree structure; and (ii) using the decision tree structure to predict one or more class variables associated with one or more multidimensional testing data objects in which only one or more feature variables are known;
- wherein the memory stores at least a portion of results associated with one or more of the data classification operations.

18. The apparatus of claim 17, wherein the class variable is found by using tree traversal on the decision tree structure.

19. The apparatus of claim 18, wherein a branch is selected to traverse based on an entropy measure.

20. The apparatus of claim 19, wherein the branch yielding the lowest entropy measure is selected as the branch to traverse.

21. An article of manufacture comprising a program storage medium readable by a computer and embodying one or more instructions executable by the computer to perform a method for generating at least a portion of a decision tree structure to classify one or more multidimensional data objects, the method comprising the steps of:
- representing data associated with the one or more multidimensional data objects as a node of the decision tree structure;
- determining a condition for dividing the data at the node into at least two subsequent nodes based on a discriminant measure which substantially maximizes separation between classes associated with the data; and
- dividing the data based on the condition, wherein the resulting nodes form at least a portion of the decision tree structure;
- wherein the steps are performed by a computer; and
- wherein the one or more multidimensional data objects comprise data records of personal attributes stored on a data storage device coupled to the computer.

22. The article of claim 21, wherein the condition determining and data dividing steps are repeated at each subsequent node.

23. The article of claim 21, wherein the discriminant measure is determined in accordance with a Fisher's discriminant technique.

24. The article of claim 23, wherein the data is divided at a split plane determined to be perpendicular to a direction determined according to the Fisher's discriminant technique.

25. The article of claim 24, wherein the split plane is determined to be a plane where an entropy measure is substantially optimized.

26. The article of claim 25, wherein the entropy measure is determined in accordance with a gini index.

27. An article of manufacture comprising a program storage medium readable by a computer and embodying one or more instructions executable by the computer to perform a method for performing data classification to classify multidimensional objects, the method comprising the steps of:

generating at least a portion of a decision tree structure from one or more multidimensional training data objects by: (i) representing data associated with the one or more multidimensional data objects as a node of the decision tree structure; (ii) determining a condition for dividing the data at the node into at least two subsequent nodes based on a discriminant measure which substantially maximizes separation between classes associated with the data; and (iii) dividing the data based on the condition, wherein the resulting nodes form at least a portion of the decision tree structure; and using the decision tree structure to predict one or more class variables associated with one or more multidimensional testing data objects in which only one or more feature variables are known;

wherein the steps are performed by a computer; and wherein the one or more multidimensional data objects comprise data records of personal attributes stored on a data storage device coupled to the computer.

28. The article of claim 27, wherein the class variable is found by using tree traversal on the decision tree structure.

29. The article of claim 28, wherein a branch is selected to traverse based on an entropy measure.

30. The article of claim 29, wherein the branch yielding the lowest entropy measure is selected as the branch to traverse.

* * * * *